(12) United States Patent
Unalmis et al.

(10) Patent No.: US 7,607,361 B2
(45) Date of Patent: Oct. 27, 2009

(54) SONAR CIRCUMFERENTIAL FLOW CONDITIONER

(75) Inventors: Omer Haldun Unalmis, Kingwood, TX (US); Espen S. Johansen, Humble, TX (US); Leslie Wayne Perry, Kingwood, TX (US); Alejandro Vera, Katy, TX (US); Daniel Rodriguez, Kingwood, TX (US); Vijay Ramakrishnan, Kingwood, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 12/035,578

(22) Filed: Feb. 22, 2008

(65) Prior Publication Data

US 2009/0211369 A1    Aug. 27, 2009

(51) Int. Cl.
*G01F 1/42* (2006.01)
(52) U.S. Cl. .................................................. 73/861.61
(58) Field of Classification Search .............. 73/861.04, 73/861.063, 861.53
See application file for complete search history.

(56) References Cited

U.S. PATENT DOCUMENTS

| | | | |
|---|---|---|---|
| 4,312,234 A * | 1/1982 | Rhodes et al. ........... | 73/861.04 |
| 5,033,312 A * | 7/1991 | Stupecky ................. | 73/861.53 |
| 6,536,291 B1 | 3/2003 | Gysling et al. | |
| 6,782,150 B2 | 8/2004 | Davis et al. | |
| 6,898,986 B2 * | 5/2005 | Daniel et al. ............. | 73/861.63 |
| 6,935,189 B2 * | 8/2005 | Richards .................. | 73/861.04 |
| 7,086,294 B2 * | 8/2006 | DeLong .................... | 73/861.63 |
| 2002/0194932 A1 | 12/2002 | Gysling et al. | |

FOREIGN PATENT DOCUMENTS

| | | |
|---|---|---|
| GB | 2 177 803 | 1/1987 |
| GB | 2 186 981 | 8/1987 |
| GB | 2 442 117 | 3/2008 |
| WO | WO 2007/008896 | 1/2007 |

OTHER PUBLICATIONS

Ahmed, Wael H., et al., Development of two-phase flow downstream of a horizontal sudden expansion, International Journal of Heat and Fluid Flow 29 (2008), pp. 194-206, available online Jul. 25, 2007 at www.sciencedirect.com.
Johansen, Espen S., et al., U.S. Appl. No. 11/625,460, filed Jan. 22, 2007, claiming benefit of U.S. Appl. No. 60/826,180, filed Sep. 16, 2006.
GB Search Report, Application No. GB0902853.1, dated Jun. 19, 2009.

* cited by examiner

*Primary Examiner*—Jewel Thompson
(74) *Attorney, Agent, or Firm*—Patterson & Sheridan, LLP

(57) ABSTRACT

Methods and apparatus enable measuring flow of a fluid within a conduit. For example, flowmeters may measure the velocity of production fluid flowing through production pipe of an oil/gas well. The flowmeters rely on detection of pressure variations generated as a result of a backward-facing step as a basis for flow measurement calculations. Pressure sensing occurs away from the step in a direction of the flow of the fluid in an enhanced turbulence region of the flowmeter where the inner diameter remains enlarged as a result of the step.

20 Claims, 4 Drawing Sheets

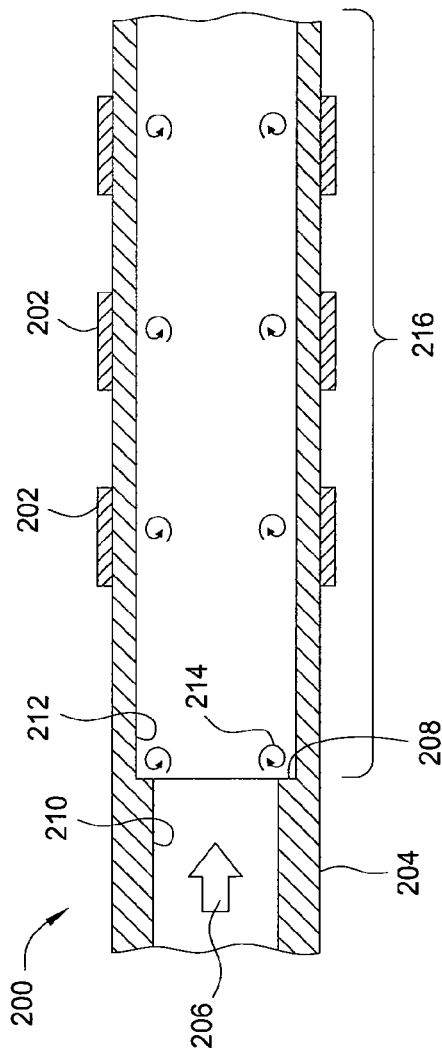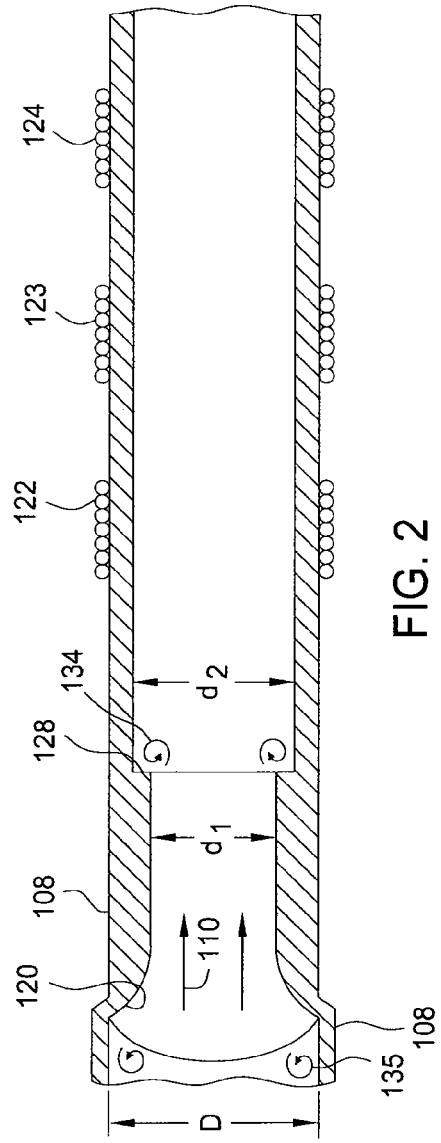

SONAR CIRCUMFERENTIAL FLOW CONDITIONER

BACKGROUND OF THE INVENTION

1. Field of the Invention

Embodiments of the invention generally relate to flow measurement apparatus and methods.

2. Description of the Related Art

In the petroleum industry, as in many other industries, ability to monitor flow of fluids in process pipes offers considerable value. Some approaches to determining flow rate of a fluid utilize a meter, referred to as a Sonar flowmeter, to detect and analyze pressure variations traveling with the fluid. However, these pressure variations due to sensitivity of the meter and signal-to-noise ratio limitations may not be detectable under some operating conditions.

For example, dynamic pressures of the flow not being above a certain minimum threshold can limit ability to detect the pressure variations. Since the dynamic pressure is based on velocity of the flow and density of the fluid, the meter may not enable measuring flow rates as slow as desired, especially for gas-rich fluids that have relatively lower densities. Further, changes in flow regimes such as occur through a nozzle can cause reductions of turbulence within the flow as the flow accelerates through the nozzle and tends to laminarize. Due to turbulence being what provides the pressure variations detected by the meter, structures that change the flow regime and may be beneficial or necessary for other reasons can adversely impact ability to detect the pressure variations, which may already be weak depending on the dynamic pressure of the flow. Redeveloping of a turbulent boundary layer occurs away from the structure that changed the flow regime. However, location of the meter where turbulent structures redevelop increases a length requirement for the meter, thereby necessitating greater installation space that may not be available in some situations, such as on offshore rigs. This excess length also adds to weight making transport more difficult and causes the meter to be more expensive and time consuming to manufacture.

Therefore, there exists a need for improved apparatus and methods for sensing flow velocity of a fluid based on detecting pressure variations traveling with the fluid.

SUMMARY OF THE INVENTION

An apparatus in one embodiment detects pressure variations within a fluid that is flowing. A conduit of the apparatus contains the fluid and has a first section with a first inner diameter and a second section with a second inner diameter larger than the first inner diameter to define between the first and second sections a backward-facing step that produces the pressure variations. An array of pressure sensors sense the pressure variations and are spaced along a length of the second section with the second inner diameter.

For one embodiment, a method of detecting pressure variations within a fluid that is flowing in a conduit permits measurement of a velocity of the fluid. The method includes introducing the pressure variations into the fluid with a backward-facing step formed by an enlargement in an inner diameter of the conduit in a direction of fluid flow. Further, sensing the pressure variations with an array of pressure sensors at spaced locations along a length of the conduit where the inner diameter remains enlarged past the step occurs prior to calculating the velocity of the fluid based on the pressure variations that are sensed.

A system detects pressure variations within a fluid for measuring flow of the fluid, in one embodiment. The system includes a conduit that contains the fluid and is configured such that a first section of the conduit is located between a second section of the conduit and a converging inner diameter portion of the conduit that gradually reduces a primary inner diameter of the conduit to a first inner diameter at the first section, which first section transitions to the second section that has a second inner diameter larger than the first inner diameter. The system further includes an array of pressure sensors to sense the pressure variations and signal interface circuitry configured to measure a velocity of the fluid based on signals from the array of pressure sensors spaced along a length of the second section with the second inner diameter.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a cross-section view of a conduit with a backward-facing step disposed ahead of sensors of a flowmeter coupled to the conduit to detect pressure variations of fluid flowing through the conduit, in accordance with embodiments of the invention.

FIG. 2 is a cut-away view of a conduit with a circumferential flow conditioner disposed between sensors of a flowmeter and a flow nozzle, according to one embodiment of the invention.

DETAILED DESCRIPTION

Figure 3:
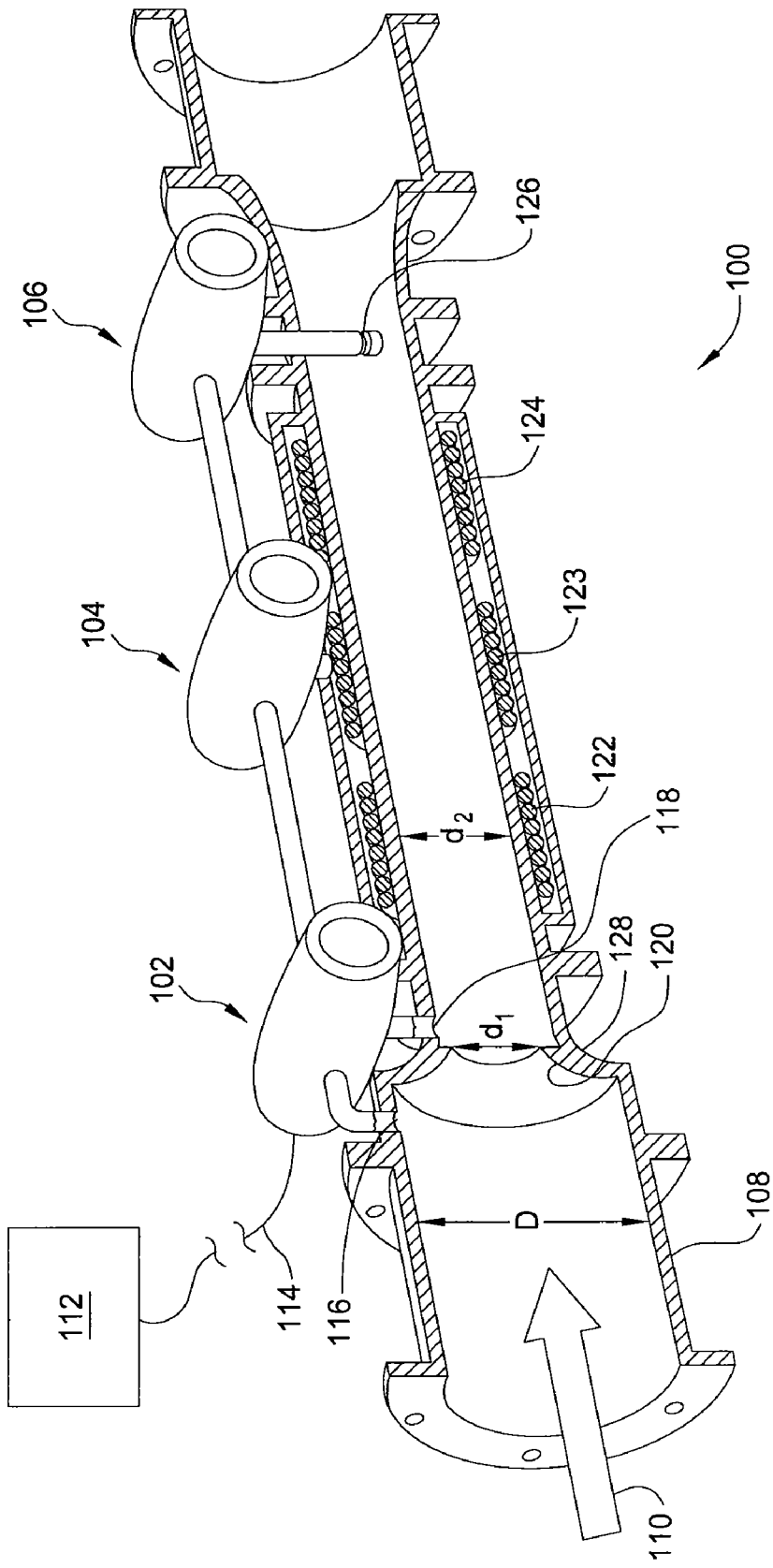
FIG. 3 is a partial cross-section view of a flow rate measuring system utilizing the circumferential flow conditioner shown in FIG. 2.

Embodiments of the invention generally relate to flowmeters, such as used to measure the velocity of production fluid flowing through production pipe of an oil/gas well. The production fluid may contain liquid and/or gaseous phases of hydrocarbons and/or water. In addition, the flowmeters may couple to conduits conveying fluids associated with other industries. The flowmeters rely on detection of pressure variations generated as a result of a backward-facing step as a basis for flow measurement calculations. Pressure sensing occurs away from the step in a direction of flow of the fluid in an enhanced turbulence region of the flowmeter where the inner diameter remains enlarged as a result of the step.

FIG. 1 illustrates a flowmeter 200 with sensors 202 distributed along a length of a conduit 204 and coupled to the conduit 204 to detect pressure variations of fluid 206 (depicted by an arrow showing flow direction) flowing through the conduit 204. Spacing between the sensors 202 enables sensing the pressure variations that travel with flow of the fluid 206 and that are induced into the flow as described further herein. For some embodiments, the sensors 202 non-intrusively measure the pressure variations with respective coils of optical fiber wrapped around the conduit 204 to define each of the sensors 202. Other pressure measuring devices such as piezoelectric or Polyvinylidene Fluoride (PVDF) based detectors can form the sensors 202 and provide pressure time-varying signals for the flowmeter 200. Interpretation of the pressure signals from the sensors 202 enables determination of at least the mixture flow velocity of the fluid 206. U.S. Pat. No. 6,782,150, which is herein incorporated by reference, describes examples of appropriate calculations for determining the velocity with similar apparatus.

The conduit 204 includes a backward-facing step 208 disposed ahead of the sensors 202. As shown, the backward-facing step 208 occurs between a first section 210 of the conduit 204 and a relatively larger inner diameter second section 212 of the conduit 204 with direction of the flow of the fluid 206 progressing from the first section 210 to the second section 212. For some embodiments, the step 208 defines, relative to the flow direction, a ninety degree transition between inner diameters of the first and second sections 210, 212 around an entire circumference of the conduit 204. Angle of transition may vary so long as separation disturbances 214 are generated for detection by the sensors 202. The separation disturbances 214 occur as a result of the fluid 206 flowing across the step 208 at which point turbulent eddies develop to fill in behind the step 208. The sensors 202 detect the separation disturbances 214 in the second section 212 of the conduit 204 that has the larger inner diameter than the first section 210. In some embodiments, the inner diameter of the second section 212 remains constant from the step 208 to across where the sensors 202 are disposed.

No requirement exists for the separation disturbances 214 to have a fixed frequency for any particular flow rate. In contrast, a vortex shedding meter for example utilizes shedding vortices in which periodicity is important. The shedding vortices require particularly shaped bluff bodies within the flow path of the meter to produce convection of the shedding vortices at a predictable certain rate. The bluff bodies are purposefully shaped to produce pressure balanced vortices symmetrical about the bluff bodies to ensure a single predictable frequency of vortices are shed for a given rate of flow of fluid within the meter. The backward-facing step 208 may provide at any single given flow rate a range of frequencies for the separation disturbances 214 in some embodiments. Analysis of the signals from the sensors 202 may correspond to multiple frequencies associated with the separation disturbances 214 to thereby provide data that may be desired for use in the aforementioned interpretation of the signals. By way of example, the step 208 being continuous and uniform around the entire circumference of the conduit 204 lacks any counterbalancing feature such that no particular periodicity is generated.

Upon being introduced into the fluid 206 as a result of a separation effect at the step 208, the separation disturbances 214 travel with the flow. The step 208 protects the separation disturbances 214 convecting past the sensors 202 for an enhanced turbulence region 216 past the step 208 where coherence endures prior to downstream re-development of flow characteristics without the separation disturbances 214. In particular, fluid within areas in the second section 212 outside of a central region corresponding to the smaller diameter of the first section 210 remain out of alignment with the flow coming from the first section 210 such that outside the central region tends to be protected at least for the enhanced turbulence region 216. This phenomenon associated with the step 208 is in contrast to a groove that lacks any such protection for potential unsteady flow fields of certain frequencies (e.g., Rossiter frequencies) generated as the flow travels across front and back walls of a cavity provided by the groove within an otherwise uniform path. In addition to the mechanism and way the separation disturbances 214 are introduced with the step 208 being different from the groove approach, the step 208 can, if desired, provide the separation disturbances 214 also without introducing restrictions in the conduit 204 since any protrusions can limit flow, inhibit passage through the conduit 204 and potentially be eroded or worn away.

For some embodiments, the enhanced turbulence region 216 includes the sensors 202 and extends axially up to about 10 or 20 diameter lengths downstream from the step 208 (based on the inner diameter of the second section 212). Height of the step 208 may vary based on application and diameter of the conduit 204. For example, the height of the step 208 compared to the diameter of the conduit 204 at the first section 210 may provide a ratio of about 0.015, as the height of the step 208 may be between 1.0 millimeter (mm) and 10.0 mm or about 3.0 mm while the diameter of the conduit 204 at the first section 210 may be between 25.0 mm and 500.0 mm or about 50.0 mm.

FIG. 2 shows a cut-away view of a conduit 108 with a circumferential flow conditioner 128 (e.g., a backward-facing step) disposed between sensing elements 122-124 of a pressure sensor array (Sonar) based meter 104 (shown in FIG. 3 by example within a flow rate measuring system 100) and a flow nozzle or converging inner diameter portion 120 of the conduit 108. A fluid flow 110 ahead of the converging inner diameter portion 120 includes turbulence 135 that at least diminishes upon the fluid flow 110 passing through the converging inner diameter portion 120 of the conduit 108. The converging inner diameter portion 120 gradually reduces the inner diameter of the conduit 108 from a primary diameter D, thereby resulting in acceleration and laminarization of the fluid flow 110. Thereafter, the flow conditioner 128 defines a transition in the direction of the fluid flow from a first inner diameter $d_1$ to a second inner diameter $d_2$ that is larger. The primary diameter D may be larger than the second inner diameter $d_2$ and may be about twice the first inner diameter $d_1$. The difference between d1 and d2 determines the step height. Variation in the step height can accommodate moderate changes in the nozzle geometry (i.e., the ratio d1/D, also known as the nozzle Beta ratio) to better match the ranges of existing differential pressure measurement transducers to the flow rates required by the application. The sensing elements 122-124 can detect, based on strain on the conduit 108 at locations where the conduit 108 retains the second inner diameter $d_2$, pressure variations caused by separation disturbances 134 produced as a result of the flow conditioner 128.

FIG. 3 illustrates an exemplary flow rate measuring system 100 utilizing the circumferential flow conditioner 128. The flow rate measuring system 100 includes a Venturi-based meter 102, the pressure sensor array (Sonar) based meter 104, and an optional water-in-liquid ratio (WLR) meter 106, all disposed along the conduit 108 containing the fluid flow 110. The meters 102, 104, 106 couple to signal interface circuitry 112 through a transmission line 114. The signal interface circuitry 112 receives and processes signals from the meters 102, 104, 106 to calculate velocity and/or phase fraction flow rates of the fluid flow 110 using logic based on principles described for example in U.S. patent application Ser. No. 11/625,460 entitled "Wet-gas Flowmeter," which is herein incorporated by reference in its entirety.

The Venturi-based meter 102 includes first and second ports 116, 118 exposed to pressures of the fluid flow 110 that traverses a constriction formed by the converging inner diameter portion 120 of the conduit 108. For some embodiments, the first and second ports 116, 118 tap into the conduit 108 respectively at where there is the primary diameter D and the first inner diameter $d_1$. The Venturi-based meter 102 defines a differential pressure sensing meter between the first port 116 disposed upstream of the converging inner diameter portion 120 and the second port 118 located in a throat section downstream of the converging inner diameter portion 120. The fluid flow 110 tends to laminarize upon passing through the converging inner diameter portion 120, thereby reducing turbulence that may be needed to achieve suitable results with the Sonar-based meter 104.

The Sonar-based meter 104 can include two or more pressure sensing elements along the enhanced turbulence region. The maximum number of sensors is limited by the physical width of each sensing element and the length of the enhanced turbulence region. Three of the pressure sensing elements 122, 123, and 124 are axially distributed along a length of the conduit 108. Proper spacing between the sensing elements 122-124 enables sensing short-duration local pressure variations traveling with the fluid flow (referred to as "flow velocity sensing") and can also enable sensing acoustic signals traveling at the speed of sound through the fluid flow 110 within the conduit 108 (referred to as "acoustic sensing"). Interpretation of these signals from the Sonar-based meter 104 enables determination of at least the mixture flow velocity ($v_m$) of the fluid flow 110 and may also enable determination of the speed of sound (SOS, $a_{mix}$) of the fluid flow 110.

The WLR meter 106 can operate based on principles of spectroscopy by relying on differences in absorption between oil and water of near-infrared light. In some embodiments, an intrusive probe of the WLR meter 106 within the fluid flow 110 provides a sample region 126 in which input light passes through a portion of the fluid flow 110 and is detected thereafter. Absorption of the input light by the fluid flow 110 attenuates the input light and depends in a wavelength conditioned manner on the contents of the fluid flow 110 to enable determining, for example, the percentage of water and the percentage of oil.

Figure 4:
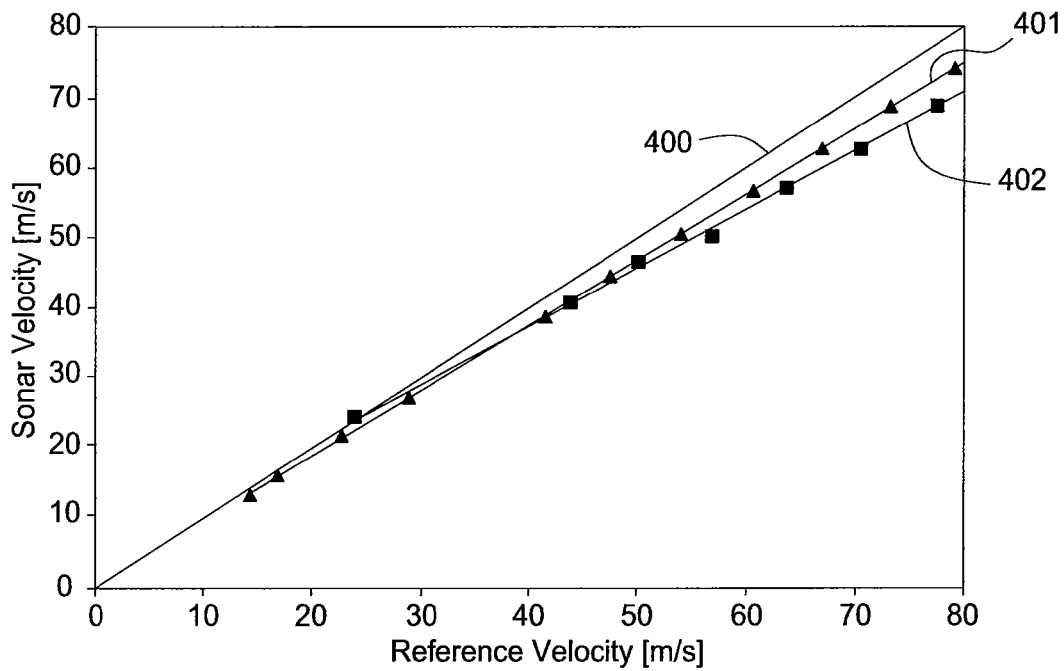
FIG. 4 is a graph of sonar velocity for flowmeters with and without a backward-facing step versus a reference velocity.
Figure 5:
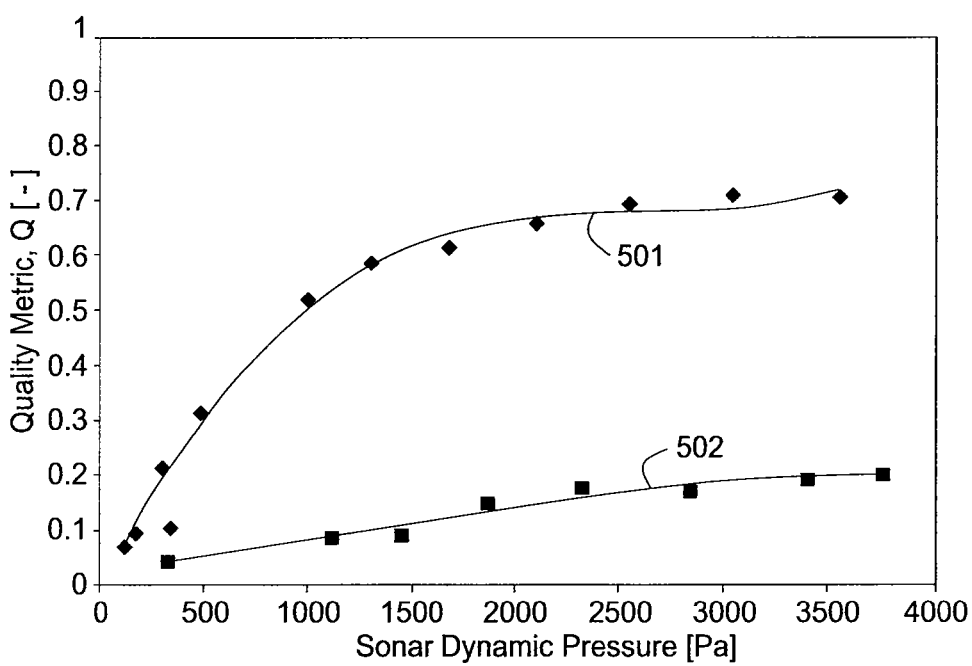
FIG. 5 is a graph for flowmeters with and without a backward-facing step of a quality metric versus sonar dynamic pressure.
Figure 6:
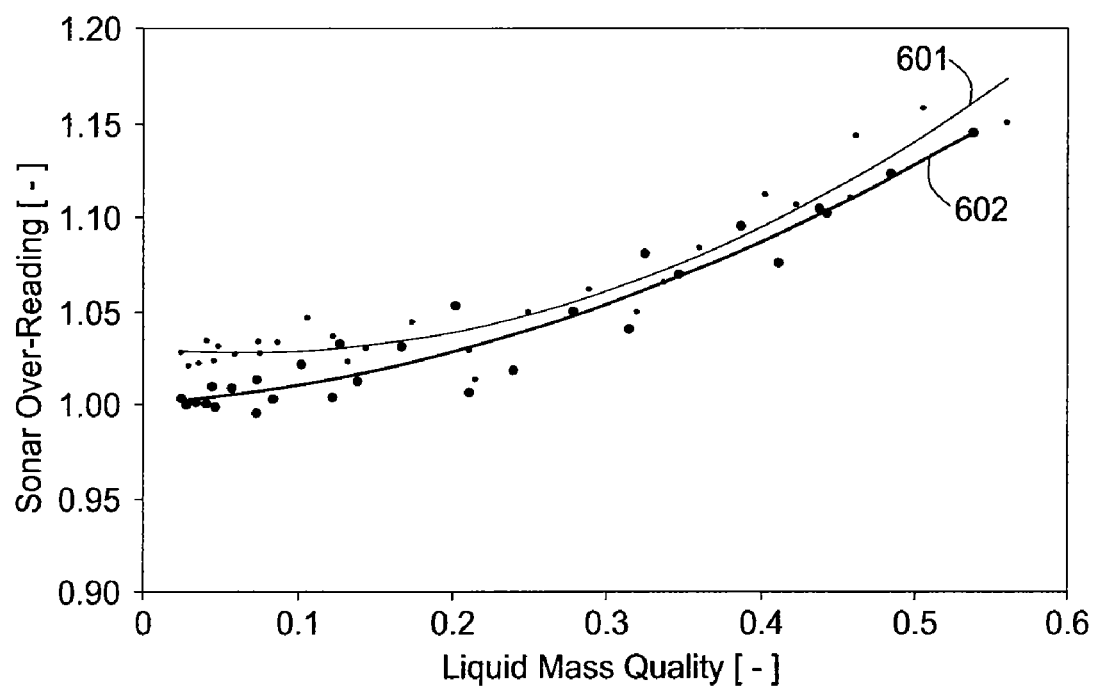
FIG. 6 is a graph of sonar over-reading for flowmeters with and without a backward-facing step versus liquid mass quality.

FIGS. 4-6 show results obtained from experiments conducted utilizing two similar flowmeters, such as the flow rate measuring system 100 shown in FIG. 3, but with only one of the two having a backward-facing step. A graph provided in FIG. 4 plots Sonar velocity determined with the flowmeters with and without the backward-facing step versus a reference velocity. A reference line 400 identifies the reference velocity. First and second lines 401, 402 correspond to data obtained using respectively the flowmeter with the backward-facing step and the flowmeter without the backward-facing step. Presence of the step only minimally affects (by about 5%) the assessed velocity based on the difference between the first and second lines 401, 402. Moreover, the first line 401 retains linearity such that the flowmeter with the backward-facing step may be calibrated similar to the flowmeter without the backward-facing step.

FIG. 5 depicts a graph of a quality metric versus sonar dynamic pressure for the flowmeter with the backward-facing step (a first curve 501) and the flowmeter without the backward-facing step (a second curve 502). Dynamic pressure is calculated based on the bulk velocity that prevails along the Sonar sensor array. The quality metric is a quantification of performance for a result of a flow array processing algorithm. The algorithm result V is the maximum of a power correlation function P(v). The flow quality metric Q is calculated by evaluating the power correlation function for a given velocity V and its negative, then forming a ratio of their difference and their sum:

$$Q = \frac{P(V) - P(-V)}{P(V) + P(-V)}.$$

Random, uncorrelated noise is direction independent. However, the energy associated with the flow vortices is correlated and moving in one direction. The quality metric measures the asymmetry of the power correlation function at a given velocity. If the quality metric is near zero, then the energy is roughly symmetrical, and there is little contrast between the vortical energy and the background noise. If the absolute value of the quality metric is near one, then the energy is larger in the direction of flow. Confidence in the array processing algorithm result may depend on the quality metric not falling below a (configurable) threshold. As it regards the backward facing step, the quality metric is a replacement for a signal to noise ratio in evaluating relative signal strength, measuring the "visibility" of the power correlation ridge.

The quality metric for the first curve 501 increases from about 0.1 at dynamic pressures of about 100 pascal (Pa) to about 0.7 for dynamic pressures of about 3500 Pa, whereas the quality metric indicated by the second curve 502 is lower by a factor of about 4 to 5 and is below 0.1 at 500 Pa and only increases to about 0.2 for dynamic pressures of about 3500 Pa. Lower dynamic pressures can thus be measured with accuracy since any reading above a threshold for the quality metric (e.g., 0.1) may provide reliable results. As shown, the flowmeter having the backward-facing step increases the dynamic range at minimum dynamic pressures by a factor of at least three compared to readings of similar quality made using the flowmeter without the backward-facing step. Further, the flowmeter with the backward-facing step thereby produces more reliable readings to enable higher confidence levels of all the measurements. For the typical material (stainless steel) and pipe thickness used in commercial sonar meters, utilizing the backward-facing step in the flowmeter may enable measurements with dynamic pressures below 500 Pa and as low as 100 Pa or 50 Pa. In other words, the backwards-facing step enhances turbulent pressure fluctuations. Said enhanced fluctuations have an amplitude that corresponds to a higher percentage of the dynamic pressure. For reference, the dynamic pressure of 100 Pa corresponds to water flow velocities of about 0.3 meters per second (m/s) in comparison to only 1.0 m/s for the dynamic pressure of 500 Pa. This increased detection ability with respect to minimum velocities can open up the possibility of using the flowmeters described herein in applications such as flare gas flow metering where the fluid flow includes flare gases.

FIG. 6 illustrates a graph of sonar over-reading for the flowmeter with the backward-facing step (a first curve 601) and the flowmeter without the backward-facing step (a second curve 602) versus a liquid mass quality. The sonar over-reading is a characteristic of the flowmeters to generate, in an increasing manner relative to higher liquid content, measured velocities higher than actual values under conditions where the amount of liquid is less than 5%. The liquid mass quality refers to the ratio of the liquid to the total mass flow rates. The first and second curves 601, 602 (within 5% of one another) possess substantially the same response and can thus allow compensation in a like manner.

While the foregoing is directed to embodiments of the present invention, other and further embodiments of the invention may be devised without departing from the basic scope thereof, and the scope thereof is determined by the claims that follow.

What is claimed is:

1. An apparatus for detecting pressure variations within a fluid that is flowing, comprising:
   a conduit containing the fluid, wherein a first section of the conduit has a first inner diameter and a second section of the conduit has a second inner diameter larger than the first inner diameter to define between the first and second sections a backward-facing step that produces the pressure variations; and
   an array of pressure sensors to sense the pressure variations, wherein the sensors are spaced along a length of the second section with the second inner diameter.

2. The apparatus of claim 1, wherein the backward-facing step has a shape that produces the pressure variations with multiple frequencies at any single given flow rate.

3. The apparatus of claim 2, wherein the shape of the backward-facing step is uniform and continuous around an entire circumference of the conduit.

4. The apparatus of claim 1, wherein the first section of the conduit is located between the step and a converging inner diameter portion of the conduit that gradually reduces a primary inner diameter of the conduit to the first inner diameter at the first section.

5. The apparatus of claim 4, wherein the converging inner diameter portion is a nozzle.

6. The apparatus of claim 4, wherein the primary inner diameter is larger than the second inner diameter.

7. The apparatus of claim 4, further comprising a differential pressure sensing meter to measure a difference in pressure between first and second ports disposed on each side of the converging inner diameter portion.

8. The apparatus of claim 1, further comprising signal interface circuitry configured to measure a velocity of the fluid based on signals from the array of pressure sensors.

9. The apparatus of claim 1, wherein the array of pressure sensors include coils of optical fiber wrapper around an exterior of the conduit.

10. The apparatus of claim 1, wherein the array of pressure sensors include piezoelectric based detectors.

11. The apparatus of claim 1, wherein the array of pressure sensors are located within one meter of the step.

12. A method of detecting pressure variations within a fluid that is flowing in a conduit in order to measure a velocity of the fluid, comprising:
   introducing the pressure variations into the fluid with a backward-facing step formed by an enlargement in an inner diameter of the conduit in a direction of fluid flow;
   reducing turbulence in the fluid with a converging inner diameter portion of the conduit prior to introducing the pressure variations, wherein the inner diameter is gradually reduced from a primary diameter ahead of the converging inner diameter portion to a first diameter prior to the enlargement at the step to a second diameter that is smaller than the primary diameter;
   sensing the pressure variations with an array of pressure sensors at spaced locations along a length of the conduit where the inner diameter remains enlarged past the step; and
   calculating the velocity of the fluid based on the pressure variations that are sensed.

13. The method of claim 12, further comprising measuring a differential pressure between upstream and downstream of the converging inner diameter portion.

14. The method of claim 12, wherein a dynamic pressure of the fluid is less than 500 pascals.

15. A system for detecting pressure variations within a fluid for measuring flow of the fluid, comprising:
   a conduit containing the fluid, wherein a first section of the conduit is located between a second section of the conduit and a converging inner diameter portion of the conduit that gradually reduces a primary inner diameter of the conduit to a first inner diameter at the first section, which first section transitions to the second section that has a second inner diameter larger than the first inner diameter;
   an array of pressure sensors to sense the pressure variations, wherein the sensors are spaced along a length of the second section with the second inner diameter; and
   signal interface circuitry configured to measure a velocity of the fluid based on signals from the array of pressure sensors.

16. The system of claim 15, further comprising a differential pressure sensing meter to measure a difference in pressure between first and second ports disposed on each side of the converging inner diameter portion.

17. The system of claim 16, further comprising a water-in-liquid ratio meter.

18. The system of claim 15, further comprising a water-in-liquid ratio meter.

19. The system of claim 15, wherein the primary inner diameter is larger than the second inner diameter.

20. The system of claim 15, wherein the velocity is measurable at dynamic pressures of the fluid as low as 100 Pa.

* * * * *